US011773788B2

(12) United States Patent
Gonidec et al.

(10) Patent No.: US 11,773,788 B2
(45) Date of Patent: Oct. 3, 2023

(54) DEVICE AND METHOD FOR DATA COMMUNICATION IN AN AIRCRAFT SUBASSEMBLY

(71) Applicant: Safran Nacelles, Gonfreville l'Orcher (FR)

(72) Inventors: Patrick Gonidec, Moissy Cramayel (FR); Jean-Paul Rami, Gonfreville l'Orcher (FR)

(73) Assignee: Safran Nacelles, Gonfreville l'Orcher (FR)

( * ) Notice: Subject to any disclaimer, the term of this patent is extended or adjusted under 35 U.S.C. 154(b) by 535 days.

(21) Appl. No.: 17/126,257

(22) Filed: Dec. 18, 2020

(65) Prior Publication Data

US 2021/0285382 A1   Sep. 16, 2021

Related U.S. Application Data

(63) Continuation of application No. PCT/FR2019/051320, filed on Jun. 4, 2019.

(30) Foreign Application Priority Data

Jun. 18, 2018 (FR) .................................... 18/55322

(51) Int. Cl.
*H04B 10/00* (2013.01)
*F02C 9/16* (2006.01)
*B64D 31/02* (2006.01)
*B64D 47/02* (2006.01)
*H04B 10/116* (2013.01)
*H04J 14/00* (2006.01)

(52) U.S. Cl.
CPC ................ *F02C 9/16* (2013.01); *B64D 31/02* (2013.01); *B64D 47/02* (2013.01); *H04B 10/116* (2013.01); *B64D 2203/00* (2013.01); *F05D 2220/323* (2013.01); *F05D 2270/01* (2013.01); *F05D 2270/301* (2013.01); *F05D 2270/3061* (2013.01)

(58) Field of Classification Search
CPC .............. H04B 10/114; H04B 10/1141; H04B 10/1143; H04B 10/1149
See application file for complete search history.

(56) References Cited

U.S. PATENT DOCUMENTS

| 5,960,626 A | 10/1999 | Baudu et al. |
| 6,614,126 B1 | 9/2003 | Mitchell |
| 8,571,409 B1 | 10/2013 | Wang et al. |
| 2003/0101712 A1 | 6/2003 | Johnson et al. |

(Continued)

OTHER PUBLICATIONS

International Search Report for International Application PCT/FR2019/051320, dated Sep. 30, 2019.

*Primary Examiner* — Daniel G Dobson
(74) *Attorney, Agent, or Firm* — Burris Law, PLLC

(57) ABSTRACT

The present disclosure concerns the communication between electronic systems in an aircraft subassembly such as a propulsion unit. This communication is at least partially carried out by light signals transmitted through at least one interior volume of the sub-assembly, this interior volume defining an optical channel. To this end, at least one of these systems includes an emitter arranged to emit a light signal and modulate it depending on data to be transmitted generated by this system, and at least one other of these systems includes at least one receiver capable of receiving this light signal.

9 Claims, 4 Drawing Sheets

(56) References Cited

U.S. PATENT DOCUMENTS

| | | |
|---|---|---|
| 2006/0056855 A1 | 3/2006 | Nakagawa et al. |
| 2008/0219671 A1* | 9/2008 | Schmitt .............. H04B 10/1149 398/131 |
| 2012/0275795 A1 | 11/2012 | Chan et al. |
| 2015/0090810 A1 | 4/2015 | Allement et al. |
| 2015/0330310 A1 | 11/2015 | Degaribody |
| 2019/0097731 A1* | 3/2019 | Ide ........................... B25J 9/042 |

* cited by examiner

DEVICE AND METHOD FOR DATA COMMUNICATION IN AN AIRCRAFT SUBASSEMBLY

CROSS-REFERENCE TO RELATED APPLICATIONS

This application is a continuation of International Application No. PCT/FR2019/051320, filed on Jun. 4, 2019, which claims priority to and the benefit of FR 18/55322 filed on Jun. 18, 2018. The disclosures of the above applications are incorporated herein by reference.

FIELD

The present disclosure relates to a communication between electronic systems in an aircraft subassembly, in particular in an aircraft propulsion unit.

BACKGROUND

The statements in this section merely provide background information related to the present disclosure and may not constitute prior art.

An aircraft propulsion unit communicates a large number of data and low level signals either within the propulsion units or between the propulsion units and the aircraft.

The communication of such data is carried out by electrical or optical cables which cause numerous integration problems.

Optical cables are for example known from the document U.S. Pat. No. 5,960,626.

Typically, the electrical cables are shielded which increases their space requirement and the mass of the aircraft. In addition, the stiffness of the shielded cables leads to difficulties of integration into the propulsion units. This results in an increase in the cost of the propulsion units and, in some cases, a change in the shape of the aerodynamic lines.

The communication of such data can also be carried out by powerline carrier, that is to say by transmission of low level signals in power electric cables.

The implementation of powerline carrier is however delicate since the high power signals are likely to pollute/interfere with the low level signals and the protection of these low level signals against external electromagnetic effects requires power cable shields thus increasing their volume.

SUMMARY

This section provides a general summary of the disclosure and is not a comprehensive disclosure of its full scope or all of its features.

The present disclosure provides an aircraft subassembly facilitating the integration of the communication systems, reducing the manufacturing or assembly costs, and/or limiting the risks of pollution/interference of low level signal by high frequency signals.

To this end, the present disclosure relates to an aircraft subassembly such as a propulsion unit, comprising data processing systems. In a non-limiting manner, these data processing systems can be selected from: a full authority digital engine control, "FADEC"; an electrical thrust reverser actuation system, called "ETRAS," to control the opening and closing of a thrust reverser of the propulsion unit; one or several system(s) for measuring and/or analyzing physical parameters such as the acceleration, the pressure or the flow rate of a gas, one or several position sensor(s); etc.

This aircraft subassembly comprises at least one interior volume defining an optical channel.

It should be noted that this optical channel is not necessarily intended to provide a clear line between an emitter and a receiver of an optical signal. Indeed, light can be transmitted in a very cluttered volume by multiple reflections and scatterings on surfaces present in the volume defining the optical channel.

In this optical channel or interior volume, the communications by wireless light signals are transmitted in free space in this interior volume. In other words, the light signals propagate in the interior volume without being guided.

Advantageously, the communications by wireless light signals can be implemented by multiple reflections and scatterings on surfaces present in this volume.

According to the present disclosure, at least one of the data processing systems comprises at least one emitter capable of emitting a light signal in said at least one optical channel. In the present document, this emitted light signal is also called an "emission signal." Said at least one transmitter is arranged to modulate the light signal depending on data to be transmitted generated by this data processing system. In addition, at least one other of the data processing systems comprises at least one receiver capable of receiving the light signal emitted by said at least one emitter.

Such an aircraft subassembly allows communicating data by reducing the number of electrical or optical cables.

The drawbacks associated with the communication by electrical or optical cables are thus limited or avoided.

In particular, the inventors believe that present disclosure can allow reducing the overall mass of a propulsion unit up to 90 kg.

Such a wireless communication also allows providing the independence of the low level signals from high power signals.

In addition, when removing the motor, the present disclosure allows avoiding the disconnection of cables at the mast.

The present disclosure also allows communicating components mounted on supports which can be displaced relative to each other, such as for example a thrust reverser sliding cowl and the fixed structure which supports it.

In one form, the at least one emitter may include a light-emitting diode.

In another form, said at least one other of the data processing systems can be arranged to emit a return signal in the at least one optical channel. In one variation, the return signal can be in a bandwidth which is different from that of the emission signal.

Such a bandwidth segregation can for example be performed by a difference in modulation of the light signals by the use of signals of different colors filtered in color on reception.

In one form, the aircraft subassembly may comprise a wall delimiting two interior volumes. These two volumes form respectively first and second optical channels. According to this embodiment, the subassembly comprises at least one transmission module capable of transmitting, in the second optical channel, a light signal emitted in the first optical channel.

Such a transmission module allows transmitting a light signal through a substantially opaque wall or partition.

According to a first variant, the transmission module can comprise a receiver arranged to receive the light signal emitted in the first optical channel, an emitter arranged to emit the light signal in the second optical channel, and an electrical cable passing through the wall so as to transmit the light signal from the receiver of this transmission module to the emitter of this transmission module in the form of an electrical signal. These two elements can be merged into a single emitter-receiver, including a portion which passes through the wall.

According to a second variant, the wall can comprise a translucent portion forming the transmission module.

These two variants are cumulative: for example, a first wall may comprise a transmission module according to the first variant and a second wall may comprise a transmission module according to the second variant.

In one form, the aircraft subassembly may comprise a mast having an interior volume constituting an optical channel.

In another form, the aircraft subassembly may comprise a portable digital tablet, this tablet constituting a data processing system comprising at least one of said at least one emitter and/or comprising at least one of said at least one receiver.

Such a tablet can allow a maintenance agent to interact with data processing systems of the propulsion unit or of the aircraft when at least one of the cowls of the nacelle is open: the volume comprised under the open cowl constitutes an optical channel capable of transmitting maintenance data by light signals under standard lighting conditions.

According to another aspect, the present disclosure also concerns a data communication method implementing an aircraft subassembly as defined above.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
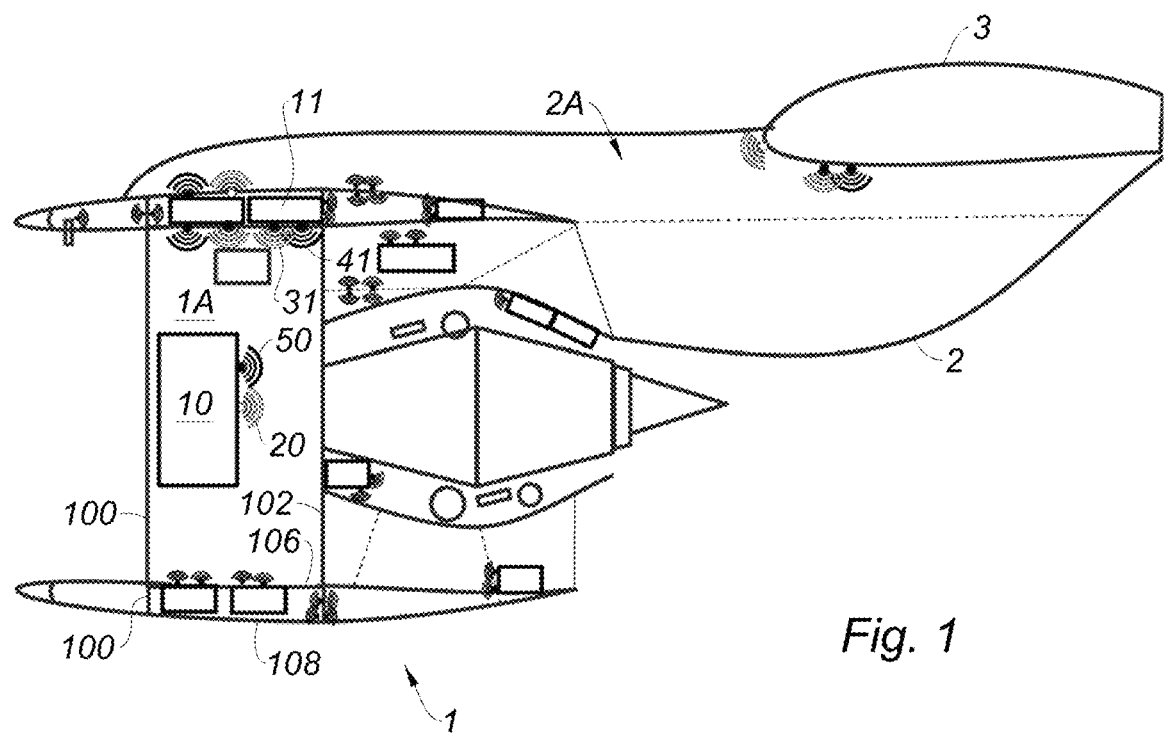
FIG. 1 is a schematic view in partial longitudinal section of an aircraft subassembly in accordance with the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

An aircraft subassembly in accordance with the present disclosure is represented in FIG. 1. This subassembly comprises a propulsion unit 1 and a mast 2 connected to a wing 3 of the aircraft.

In the following description, the propulsion unit 1 taken as an example comprises a nacelle and a bypass turbojet engine, and further comprises a thrust reverser. Of course, the present disclosure can be implemented in any type of aircraft and any type of corresponding propulsion unit.

The sub-assembly of FIG. 1 comprises multiple data processing systems, including a full authority digital engine control 10 (FADEC), an electrical thrust reverser actuation system 11 (ETRAS) arranged to control the opening and closing of the thrust reverser, systems for measuring and analyzing physical parameters such as the acceleration, the pressure or the flow rate of a gas, and position sensors.

In general, the present disclosure can be implemented in a propulsion unit equipped with data processing systems for its operation.

With reference to FIG. 1, the sub-assembly which is illustrated therein comprises a plurality of interior volumes 1A, 1B, 2A, etc. These volumes are delimited by walls, partitions or components of this sub-assembly. For example, the volume 1A is delimited by an inner wall 106 and an outer wall 108 of a middle section of the nacelle of the propulsion unit 1, by a wall 100 separating the middle section from an upstream section of the nacelle, and by a wall 102 separating the middle section from a rear section of the nacelle. For another example, the volume 2A is a volume delimited by walls of the mast 2.

These interior volumes are volumes already existing in the propulsion units of the aircraft. These volumes are generally narrow and cluttered with elements or members constituting obstacles. These volumes are relatively protected from external light without necessarily being optically enclosed. The present disclosure therefore takes advantage of such confined volumes to communicate data using light signals emitted in these volumes which thus define optical channels, by multiple direct lines or scatterings or reflections on the surfaces present in these volumes.

According to the present disclosure, at least one of the data processing systems, for example the FADEC 10, comprises at least one emitter 20 capable of emitting a light signal in the optical channel 1A. This emitter 20 is arranged to modulate the light signal depending on data to be transmitted generated by this data processing system 10. In addition, at least one other of the data processing systems, for example the ETRAS 11, comprises at least one receiver 31 capable of receiving the light signal emitted by the emitter 20.

In order to communicate data in the opposite direction, the ETRAS 11, or more generally said at least one other of the data processing systems, can be arranged to emit a return signal in the optical channel 1A, which in one form is in a bandwidth different from the bandwidth of the emission signal. To do this, the ETRAS 11, or this other data processing system, comprises a return emitter 41 capable of emitting a light signal in the optical channel 1A and arranged to modulate this light signal depending on data to be transmitted generated by this other data processing system 11.

In this example, the FADEC 10 comprises a return receiver 50 capable of receiving the return light signal emitted by the return emitter 41.

Figure 2:
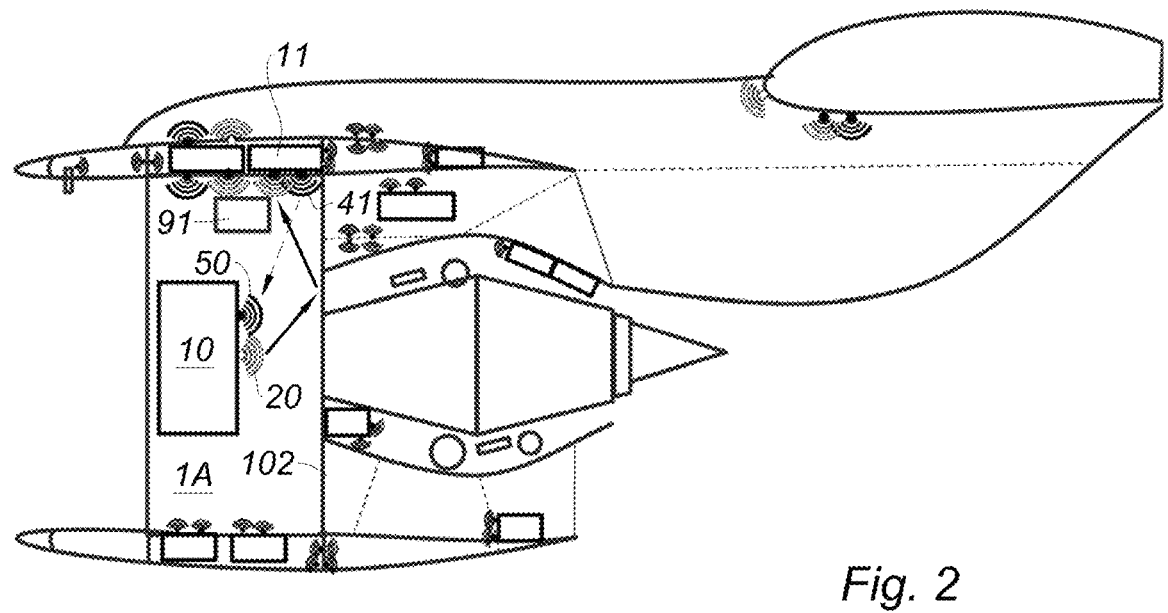
FIG. 2 is another schematic view in partial longitudinal section of the aircraft subassembly illustrating communication between a FADEC and an ETRAS in accordance with the present disclosure.

FIG. 2 illustrates such a communication between the FADEC 10 and the ETRAS 11: the FADEC 10 transmits a command to the ETRAS 11 by emission of a light signal in the optical channel 1A via the emitter 20. The light signal emitted by the emitter 20 is represented by arrows in solid line. This command signal emitted by the emitter 20 is in this example reflected on the wall 102 before arriving at the receiver 31, due to the presence of an obstacle 91. Conversely, the ETRAS 11 transmits a return signal to the FADEC 10 by emission of a light signal in the optical channel 1A via the return emitter 41. The light signal emitted by the return emitter 41 is represented by a dashed arrow. In this example, the return signal emitted by the return emitter 41 arrives directly at the return receiver 50, possibly with multi-reflections between the motor and the cowls, given the geometry of the volume (between cowl and motor, for example).

The above applies of course to the communication between any pair of data processing systems separated by an optical channel defined by an interior volume of an aircraft subassembly.

For example, with reference to the embodiment which has just been described, the data processing system 11 may include not of an ETRAS, but of a system for controlling a section variation of a secondary nozzle of the propulsion unit (not represented).

Figure 3:
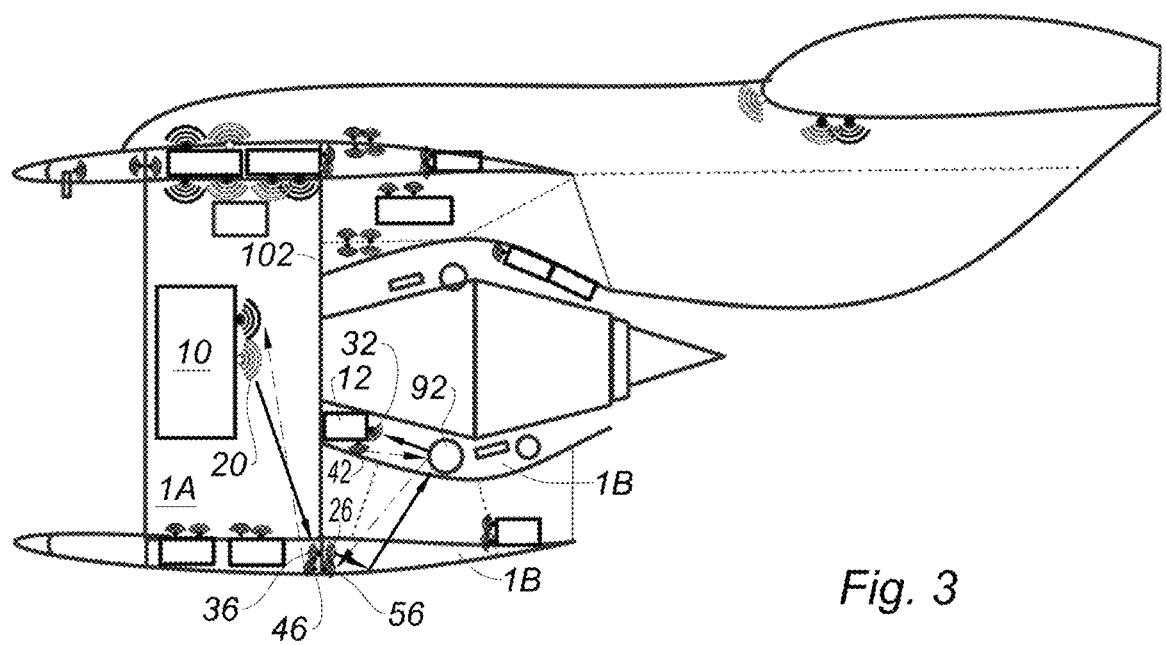
FIG. 3 is another schematic view in partial longitudinal section of the aircraft subassembly illustrating a communication between the FADEC and an actuator provided to change the geometry of a high pressure turbine in accordance with the present disclosure.

FIG. 3 illustrates a communication between the FADEC 10 and an actuator 12 provided to change the geometry of a high pressure turbine (not represented) of the propulsion unit 1. Such an actuator 12 is commonly designated by the acronym "VSV" (Variable Stator Valve).

In the example of FIG. 3, the FADEC 10 transmits a command to the actuator 12 by emitting a light signal in the optical channel 1A via the emitter 20. The light signal emitted by the emitter 20 is represented by an arrow in solid line and arrives in this example directly at a receiver 36 mounted on the wall 102 such that the receiver 36 opens into the optical channel 1A. An emitter 26 is mounted on the wall 102 facing the receiver 36 such that this emitter 26 opens into a volume 1B defining an optical channel of the rear section of the nacelle. The receiver 36 and the emitter 26 can be connected by an electrical cable passing through the wall 102 so as to transmit the light signal from the receiver 36 to the emitter 26 in the form of an electrical signal. The light signal is then re-emitted by the emitter 26 in the optical channel 1B to arrive at a receiver 32 of the actuator 12 (arrows in solid line). In this example, the command signal emitted by the emitter 26 is reflected on an obstacle 92 before arriving at the receiver 32 of the actuator 12.

In the example of FIG. 3, the actuator 12 transmits a return signal to the FADEC 10 by emission of a light signal in the optical channel 1B via a return emitter 42. The light signal emitted by this return emitter 42 is represented by dashed arrows. In this example, the return signal emitted by the return emitter 42 arrives at a return receiver 56 after reflection on the obstacle 92. The return receiver 56 is mounted on the wall 102 such that this return receiver 56 opens into the optical channel 1B. A return emitter 46 is mounted on the wall 102 facing the return receiver 56 such that this return emitter 46 opens into the optical channel 1A. The return receiver 56 and the return emitter 46 can be connected by an electrical cable passing through the wall 102 so as to transmit the light signal from the return receiver 56 to the return emitter 46 in the form of an electrical signal.

The present disclosure thus allows communicating a signal through a wall separating two interior volumes forming respectively first and second optical channels.

In the example described above, the emitter 26 and the receiver 36 constitute a transmission module: the receiver 36 is arranged to receive the light signal emitted in the optical channel 1A, the emitter 26 is arranged to emit the light signal in the optical channel 1B. Thus, this transmission module is capable of transmitting in the optical channel 1B a light signal emitted in the optical channel 1A.

The return emitter 46 and the return receiver 56 constitute another similar transmission module.

Alternatively, a portion of the wall delimiting two optical channels may be translucent so as to constitute a transmission module requiring no emitter or receiver.

Other examples of data transmission between data processing systems are represented in FIGS. 4 to 7. In the same manner as in the examples of FIGS. 2 and 3, the command signals are represented by solid lines and the return signals by dashed lines.

Figure 4:
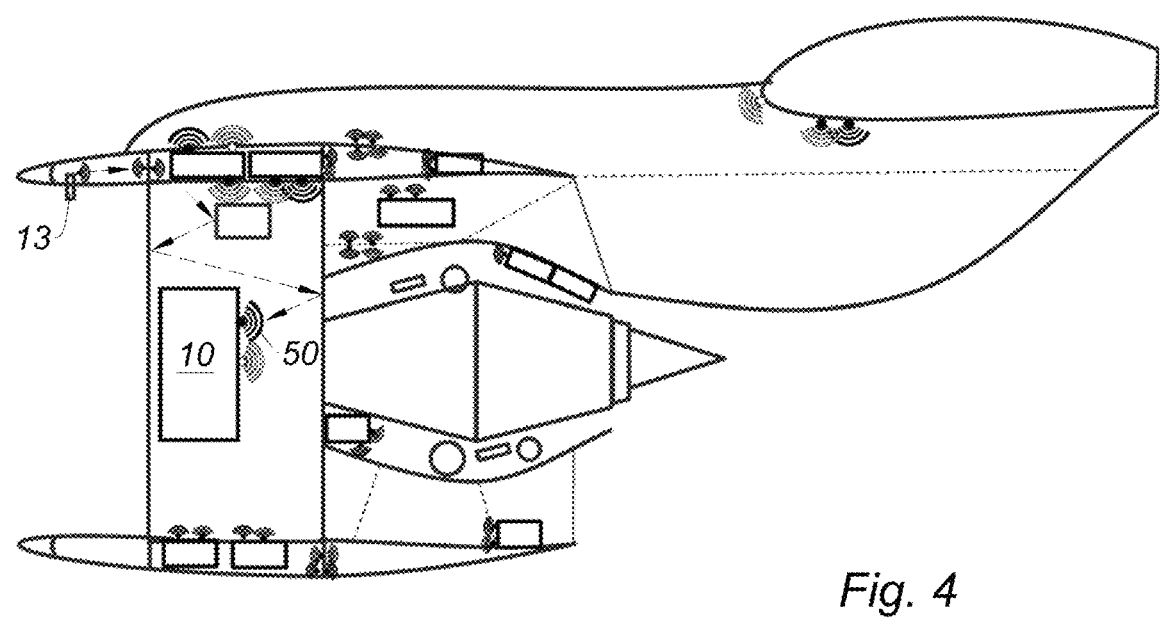
FIG. 4 is another schematic view in partial longitudinal section of the aircraft subassembly illustrating a data transmission between a system for measuring a physical parameter and on the FADEC in accordance with the present disclosure.

FIG. 4 illustrates a data transmission between, on the one hand, a system 13 for measuring a physical parameter such as the flow rate of the air entering the nacelle and, on the other hand, the FADEC 10.

Figure 5:
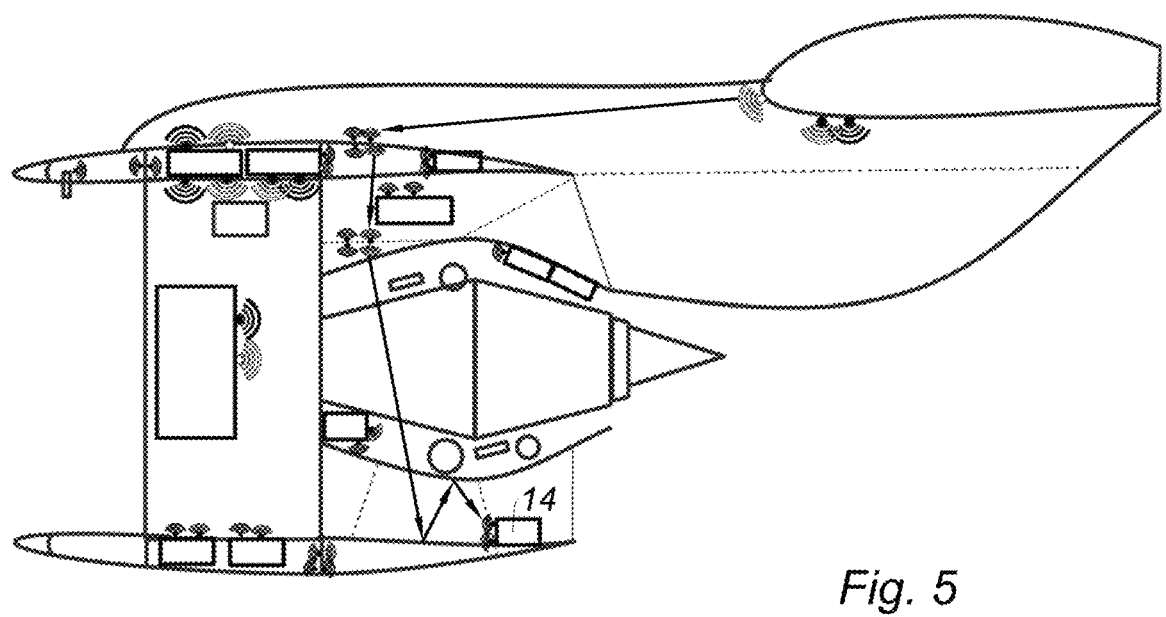
FIG. 5 is another schematic view in partial longitudinal section of the aircraft subassembly illustrating a data transmission between a computer located in the aircraft and a system, for example a locking system offset towards the rear of the nacelle in accordance with the present disclosure.

FIG. 5 illustrates a data transmission between a computer (not represented) located in the aircraft and a system 14, for example a locking system ("Tertiary Lock System") offset towards the rear of the nacelle.

Figure 6:
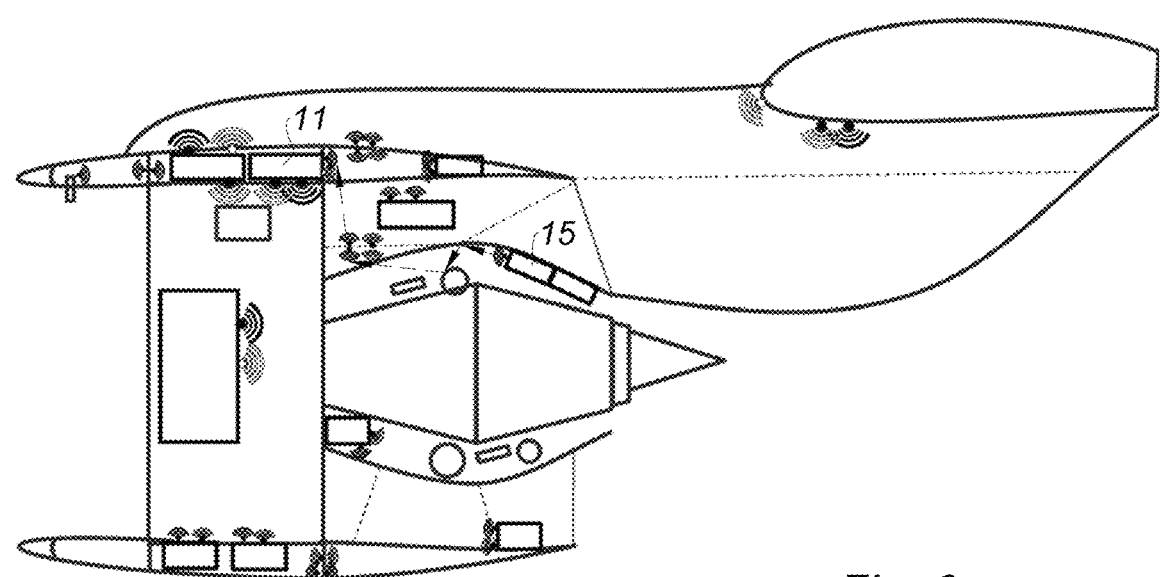
FIG. 6 is another schematic view in partial longitudinal section of the aircraft subassembly illustrating a data transmission between a sensor and the ETRAS in accordance with the present disclosure.

FIG. 6 illustrates a data transmission between a sensor 15 and the ETRAS 11. This sensor 15 can be powered or autonomous.

Figure 7:
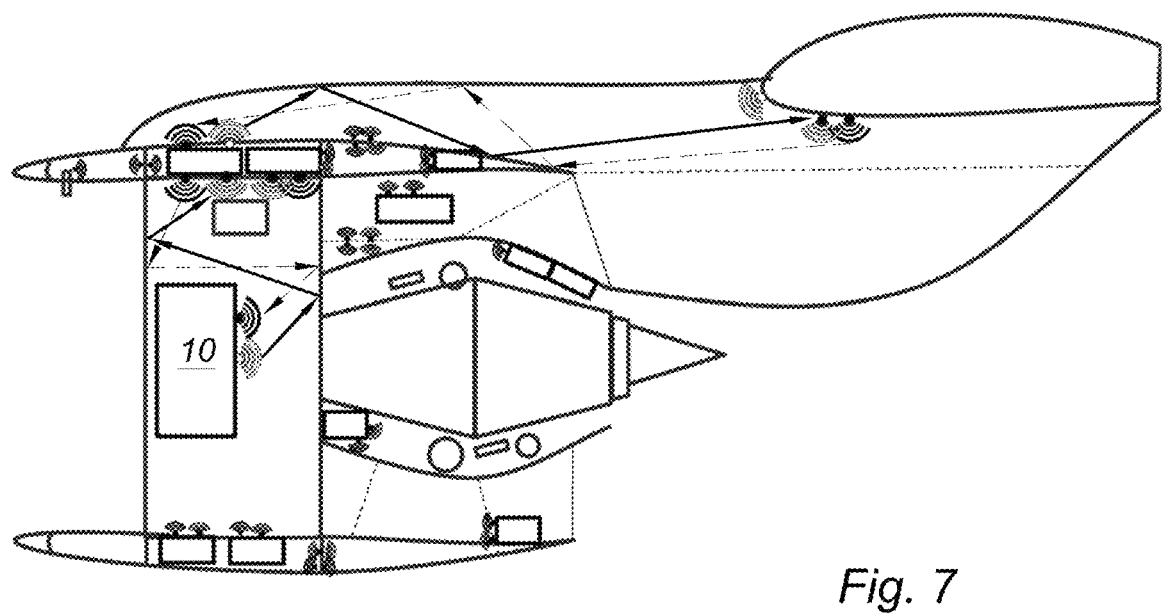
FIG. 7 is another schematic view in partial longitudinal section of the aircraft subassembly illustrating a mutual transmission of data between a computer located in the aircraft and the FADEC in accordance with the present disclosure.

FIG. 7 illustrates a mutual transmission of data between a computer (not represented) located in the aircraft and the FADEC 10.

Figure 8:
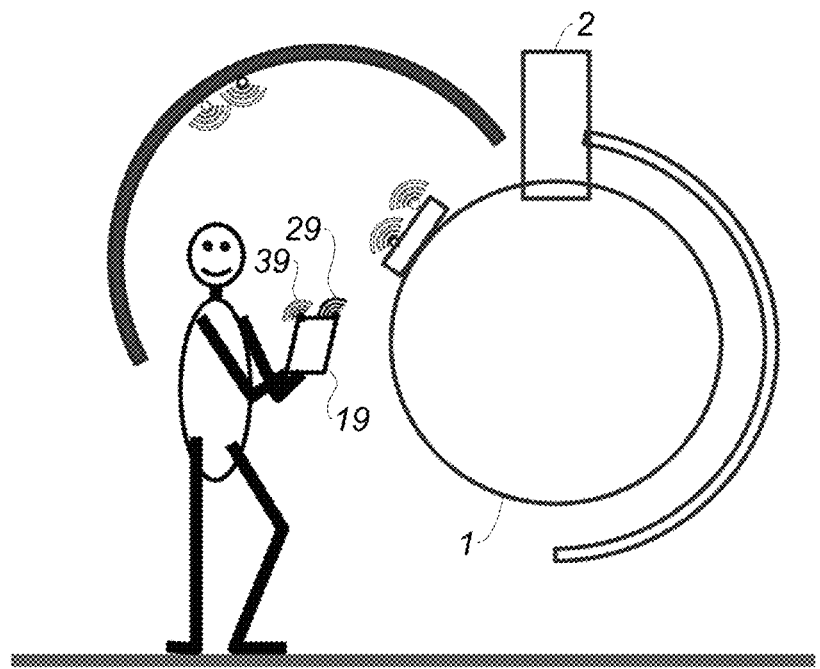
FIG. 8 is a schematic cross-sectional view of an aircraft subassembly in accordance with the present disclosure in the maintenance configuration.

In the example of FIG. 8, a portable digital tablet 19 constitutes a data processing system. This portable digital tablet 19 comprises an emitter 29 and a receiver 39.

Of course, the present disclosure is not limited to the examples which have just been described and numerous arrangements can be made to these examples without departing from the scope of the present disclosure. For example, the modulation of the light signal may comprise a modulation of frequency and/or amplitude of the carrier wave, and/or a change in the color of the light signal. For example again, an emitter and a receiver of a data processing system can be coupled in a single member.

In the case where a receiver and an emitter can be in a straight line, it will be advantageous to reduce the opening angle of the emitted light or to focus it towards the receiver, for example by emitting substantially parallel rays aimed at the receiver. This is particularly advantageous in an environment which is quite heavily light-polluted, for example when a cowl is open or in the vicinity of an orifice which not protected from external light.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An aircraft propulsion unit comprising a plurality of data processing systems, the aircraft propulsion unit comprising at least one interior volume defining an optical channel, at least one of the data processing systems comprising at least one emitter configured to emit a light signal in said optical channel, said at least one emitter being arranged to modulate the light signal depending on data to be transmitted generated by the data processing system, and in that at least one other of the data processing systems comprises at least one receiver capable of receiving the light signal emitted by said at least one emitter, wherein the at least one interior volume allows a communication by wireless light signals emitted in the interior volume by multiple direct lines or scatterings or reflections on surfaces in the interior volume.

2. The aircraft propulsion unit according to claim 1, wherein the data processing systems comprise at least one of a full authority digital engine control, an electrical thrust reverser actuation system arranged to control opening and closing of a thrust reverser of the aircraft propulsion unit, at least one system for measuring and/or analyzing physical parameters including acceleration, gas pressure, or gas flow rate of a gas, and at least one position sensor.

3. The aircraft propulsion unit according to claim 1, wherein the at least one emitter comprises a light-emitting diode.

4. The aircraft propulsion unit according to claim 1, wherein said at least one other of the data processing systems is arranged to emit a return signal in the optical channel, the return signal being in a bandwidth different from that of the emitted light signal.

5. The aircraft propulsion unit according to claim 1, further comprising a wall delimiting two interior volumes, the two interior volumes forming respectively first and second optical channels and comprising at least one transmission module configured to transmit, in the second optical channel, a light signal emitted in the first optical channel.

6. The aircraft propulsion unit according to claim 5, wherein the transmission module comprises a receiver arranged to receive the light signal emitted in the first optical channel, an emitter arranged to emit the light signal in the second optical channel, and an electrical cable passing through the wall so as to transmit the light signal from the receiver of the transmission module to the emitter of the transmission module in the form of an electrical signal.

7. The aircraft propulsion unit according to claim 5, wherein the wall comprises a translucent portion forming a transmission module.

8. The aircraft propulsion unit according to claim 1, further comprising a mast having an interior volume comprising an optical channel.

9. The aircraft propulsion unit according to claim 1, further comprising a portable digital tablet, the portable digital tablet defining a data processing system comprising at least one of said at least one emitter and said at least one receiver.

* * * * *